Jan. 9, 1934.  E. D. JANSEN  1,943,077
POULTRY DRESSING MACHINE
Filed July 17, 1929  4 Sheets-Sheet 1

INVENTOR.
ERNEST D. JANSEN, DECEASED BY
AGNES C. JANSEN, ADMINISTRATRIX.
BY
E. M. Bentley
ATTORNEY Jan. 9, 1934.  E. D. JANSEN  1,943,077
POULTRY DRESSING MACHINE
Filed July 17, 1929   4 Sheets-Sheet 4
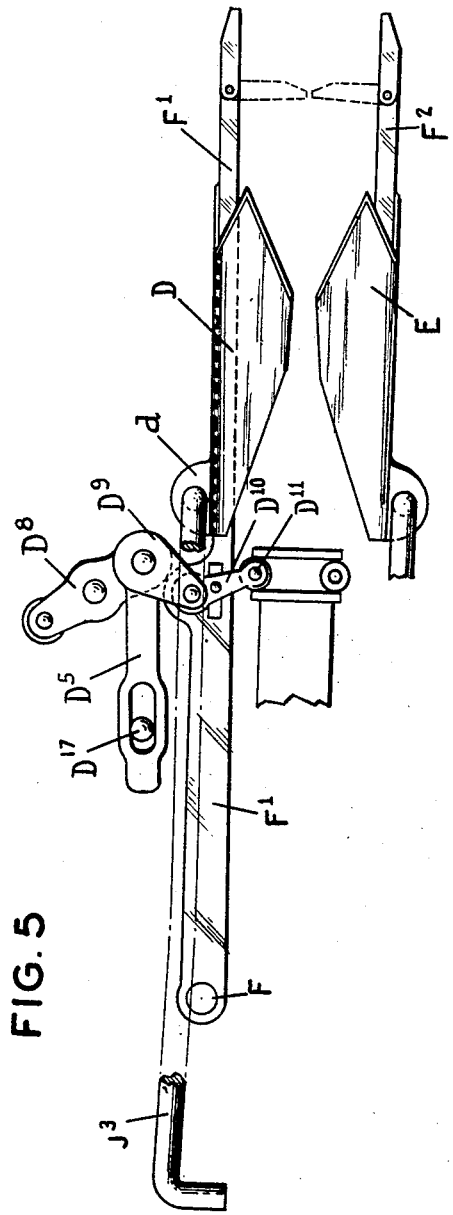
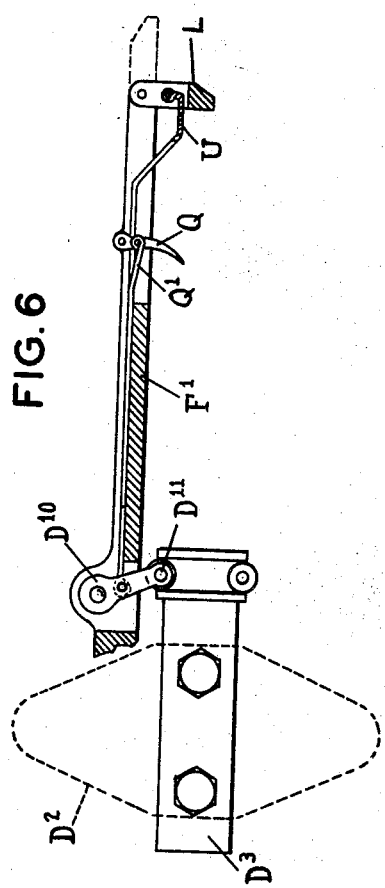
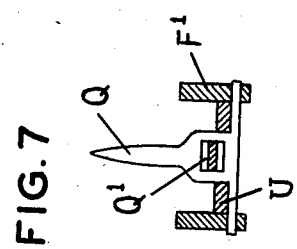
INVENTOR.
ERNEST D. JANSEN, DECEASED BY
AGNES C. JANSEN, ADMINISTRATRIX.
BY
E. M. Bentley
ATTORNEY

UNITED STATES PATENT OFFICE 1,943,077

POULTRY-DRESSING MACHINE

Ernest D. Jansen, deceased, late of Albany, N. Y., by Agnese C. Jansen, administratrix, Albany, N. Y., assignor to Draw-Trim Corporation of America, Albany, N. Y., a corporation Application July 17, 1929. Serial No. 379,020

25 Claims. (Cl. 17—11)

For a detailed description of the present form of this invention, reference may be had to the following specification and to the accompanying drawings forming a part thereof, wherein Fig. 1 shows the top of the machine with a bird thereon in position for operation;

Figs. 5, 6 and 7 show details.

This invention consists in certain improvements on a poultry-dressing machine invented by Sol Bookheim and disclosed in his application for United States Patent, Serial Number 304,341, filed September 6, 1928, as a renewal of his original application Serial No. 48,619 filed August 6, 1925 which is now Pat. #1,798,585, dated Mar. 31, 1931.

The purpose of the Bookheim machine is to dress the body of a chicken or other fowl in order to place it in condition for cooking, by cutting off the head and legs and removing the entrails, an operation which had previously been performed manually at a considerable loss of time, at greater cost and decreased perfection. By the said machine the operation is performed mechanically with speed, cheapness and other results that are satisfactory and valuable. In brief the bird is laid on a suitable support, back downward, and while in that position the operation of the machine forces certain knives against the support, cutting off the head of the bird, also both legs at the hock joint, and proceeds to eviscerate the fowl by means of a gripper that enters the lower part of the body through an opening cut therein by an advance knife. The gripper is formed of two substantially parallel prongs which, upon entering the body of the bird, are automatically spread apart to embrace the entrails, and, near the end of the inward stroke, are allowed to approach each other at their tips and so grip between them the mass of entrails and, on the receding stroke, draw them away from the bird.

The present improvements include means for operating the machine by a motor, also means for a more secure mounting of the bird on the machine, and, in connection with the gripper, a separately moving cutter thereon which first precedes the gripper to cut an opening for it in the body of the bird and then allows the gripper to go ahead of it to enter and perform its eviscerating functions.

Other features of improvement will become manifest as this specification proceeds.

Figure 4:
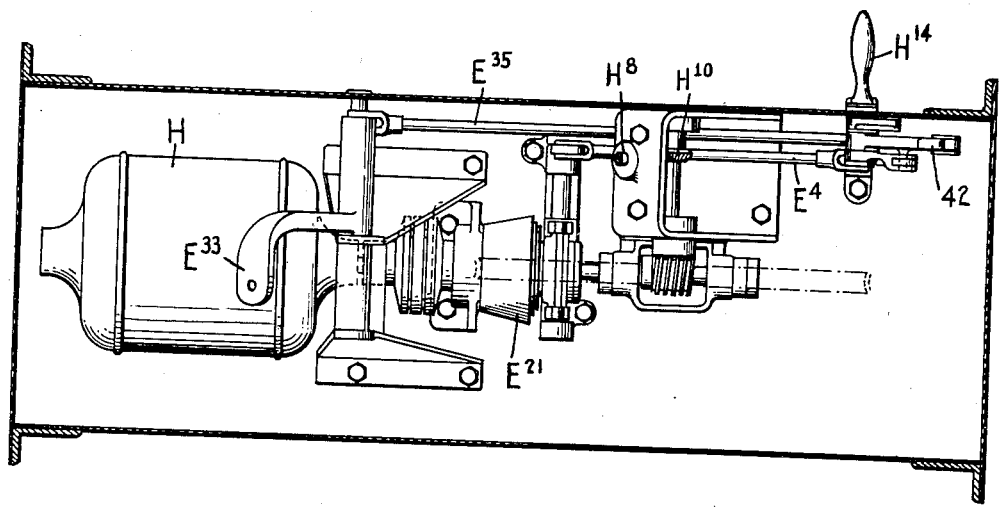
Fig. 4 is a plan of the motor mechanism.
Figure 1:
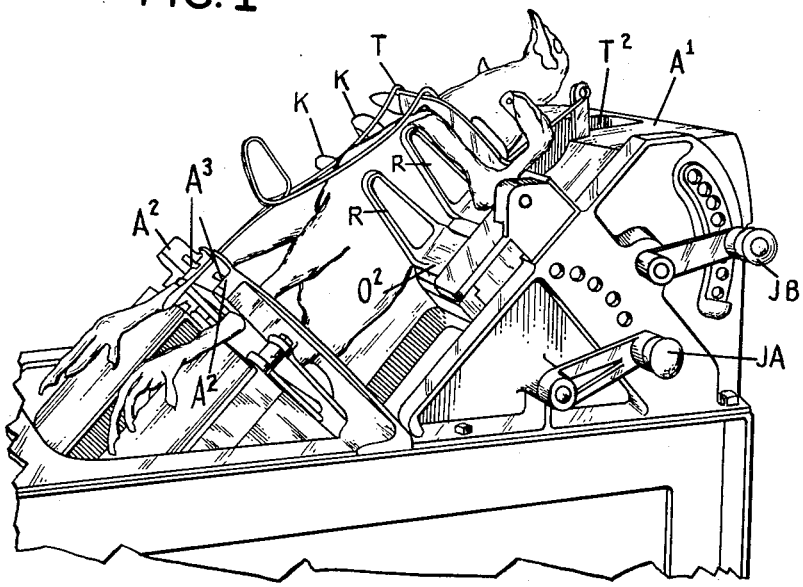
Figure 2:
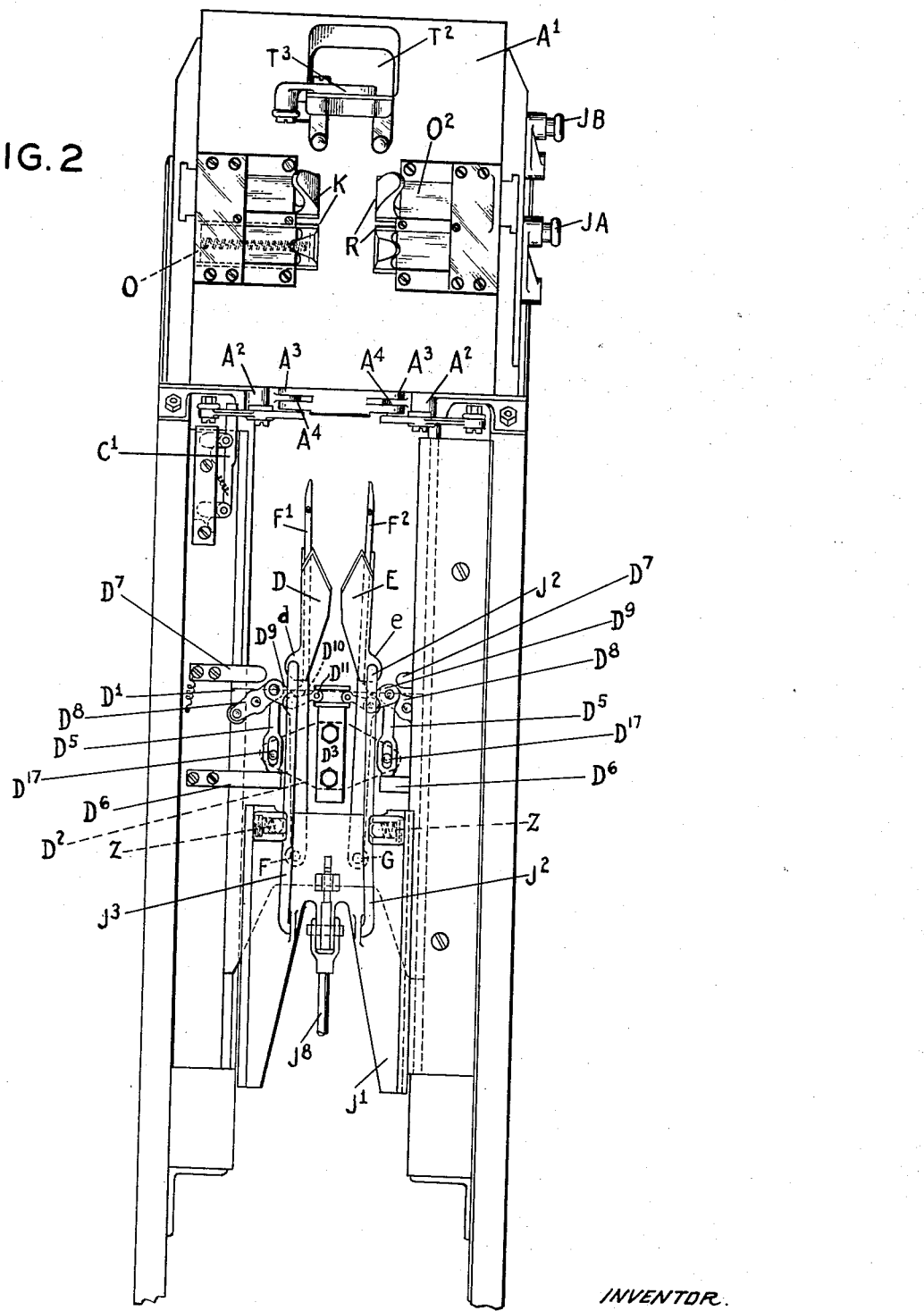
Fig. 2 shows the front of the machine with the cover removed.
Figure 3:
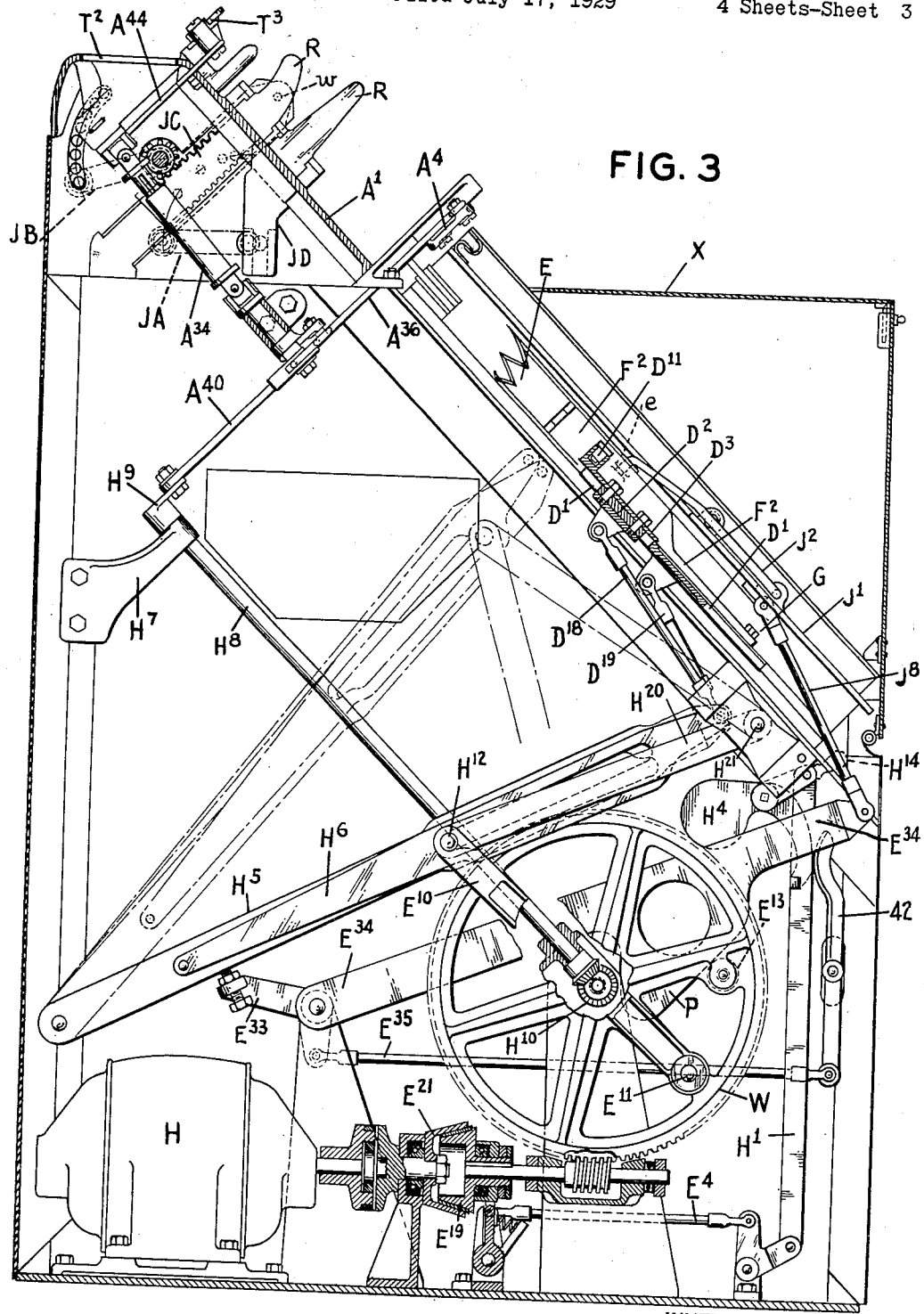
Fig. 3 shows a side view with the cover removed and contains parts in section.

Referring to the drawings, X, Fig. 3, represents the rectangular enclosing case. Projecting above the case at an angle is a receiving table $A^1$ on which the bird is placed and secured, as shown in Fig. 1. On either side of the bird are two clamps, those on one side being marked K, K, and those on the other side R, R. Each of these clamps is L-shaped and seated in a guideway $O^2$ on the table, being normally pressed against the bird by a spring O, as appears in Fig. 2. The bird, after being placed in the clamps, is held down therein by a spring T and its head dropped back and down through a hole $T^2$ in table $A^1$. This brings the neck under a knife $T^3$, shown in Fig. 2. The wings of the bird are spread out on either side above the respective clamps K and R and held down by the spring T. Each leg is thrust between two jaws $A^2$ and $A^3$ and, in that position, the knife $A^4$ will cut through the joint, leaving the flesh adhering to the bone above the joint. The table $A^1$ is adjusted by means of handles J A and J B, Fig. 1, to suit the size of the bird, the gripper being non-adjustable with respect to its location in the machine and to its line of action. By adjusting the table, a larger or smaller bird may be brought into line with the gripper. As shown in Fig. 3, the handle J B operates, by means of a pinion, to raise and lower a slide J C on which the table is trunnioned at the point $w$, while handle J A, by means of a cam and slot in the arm J D projecting down from the table, turns the table about the point $w$ as a center and so adjusts the angle at which the table stands.

The gripper and its associated cutter move in approximately the same line of reciprocation, the cutter blade being of a box shape encircling the gripper, but they each have an individual cycle of advance and recession towards and from the body of the bird. Their route is along an incline which, as appears in Fig. 3, is approximately a continuation of the inclined table on which the bird is secured. Thus, referring to Fig. 3, the aforesaid route lies diagonally across the upper right hand corner of the enclosing case. In the plan view, Fig. 2, $F^1$, $F^2$ represent the two gripper bars, while D, E represent the two box-like cutter blades with points at their forward ends and enclosing the gripper bars. In this view the grippers are shown ahead of the cutters, but their relative positions change during the operation. Thus, at the start, the cutters move ahead of the grippers to cut an opening into the body of the bird through which opening the grippers may enter to perform their eviscerating duty. As the grippers enter the bird, the cutters drop back, having finished their work. The gripper-bars $F^1$, $F^2$ also form the guideways along which the cutters D and E respectively slide. The gripper-bars $F^1$ $F^2$ are, at their rear ends, namely at F and G, pivoted to a long reciprocating plate $D^1$ (see Fig. 3) which is mounted in parallel guideways on either side. The gripper-bar $F^2$, which appears in side view on Fig. 3, is shown as reduced in height towards its rear end where it is pivoted at G to the plate $D^1$ aforesaid. The cutters D and E have at their rear ends and on the outer side, ears $d$ and $e$, which ears receive respectively the downturned ends of links $J^3$ and $J^2$, the rear ends of these links being hooked into a reciprocating plate $J^1$. The links $J^2$, $J^3$ are also pressed inward by the spring-rollers Z, Z, which, in the retracted position of the links, bear in depressions therein. The said link-operating plate $J^1$ moves in the lateral guideways, parallel to the aforesaid plate $D^1$ which carries the gripper bars, $F^1$, $F^2$, but at a higher level. Each plate $D^1$ that carries the gripper-bars and plate $J^1$ that is linked to and operates the cutter-blades D and E, has its own separate actuating means, as will be hereinafter described, such separate actuating being required by reason of the separate cycle which each follows. The cutter-blades D and E start forward, closed together and overlapping. They shoot ahead of the gripper-bars $F^1$ and $F^2$, which also start forward in a partly closed relation, at the same time as the cutter-blades, but advance more slowly. The cutters thus reach the bird first and pierce into it, opening up a passageway for the grippers. After forming this opening and after spreading apart sufficiently, the cutter-blades D and E drop back, but the grippers continue to move forward and spread apart.

It will be remembered that the gripper-bars need to be spread apart just after they enter the bird, in order to embrace the entrails of the fowl contained in the cavity entered by the grippers. When they approach the outer limit of their stroke, the tip of the respective gripper-bars, which are pivoted thereto, are automatically turned inward towards each other at right angles to the bars till their extremities meet. Thereby they come in back of and behind the mass of entrails in the cavity and, on the reverse or outward stroke, sweep them ahead of them, out of the cavity. These pivoted tips are termed "hands", because of the function they perform. On one of the gripper-bars there is also a barb or spur which is also turned out at right angles to the gripper-bar simultaneously with and by the same mechanism as the hands. The purpose of the barb is to hook into the gizzard of the fowl. The gizzard is a tough organ, clinging tightly to the wall of the cavity and forming an anchoring member for a considerable part of the entrails. By dislodging the gizzard with the aid of the barb, the remaining mass is easily removed. Near the end of their backward stroke the grippers again spread apart and drop the entrails down through the opening in the table. The forward and backward movements of the two gripper-bars correspond with the movements of the lower plate $D^1$ on which they are mounted, and the similar movements of the cutter blades correspond with those of the upper plate $J^1$ to which they are linked. The movements of the respective plates $D^1$ and $J^1$ are produced by cam mechanism that will be described hereinafter, but the spreading and drawing together of both the cutters and the gripper-bars will be explained first, referring particularly to the plan view in Fig. 2. On the said plate $D^1$, to which the gripper-bars $F^1$ and $F^2$ are pivoted at their rear ends, are two toggle-levers $D^8$ and $D^9$ jointed together at their adjacent ends. Lever $D^8$ is centrally pivoted on the plate $D^1$ and carries a roller at its outer end. Lever $D^9$ is jointed to the bar $F^1$ by an eye on the rear side of the bar. A like toggle is provided on the opposite side for gripper-bar $F^2$. Manifestly when these toggles are straightened out, the two gripper-bars will be forced towards each other, or will be drawn apart when the toggle is broken, as it is in Fig. 2. Since the toggle-levers and the gripper-bars are both mounted on the same plate $D^1$ they will all travel together. To the knuckle of each toggle is pivoted a short bar $D^5$ which has a slot embracing a pin $D^{17}$ on the plate $D^1$. As the gripper-bars and plate $D^1$ descend and approach the end of their reverse stroke, the lower ends of the bars $D^5$ strike the respective stops $D^6$. That acts to break the toggle and spreads apart the two gripper-bars, permitting them to drop their load of entrails that they have drawn out of the fowl. The toggles are also controlled by the stops $D^7$, which, as the gripper-bars start forward, hit the knuckles of the toggles, causing them to straighten and force the gripper-bars towards each other. Moreover, as the said bars progress on their forward stroke, the roller on the outer end of toggle-lever $D^8$ will strike and roll along the stationary cam-plate $C^1$ and the toggles will therefore break and draw the gripper-bars apart once more. The automatic operation of the pivoted tips or "hands" on the gripper-bars $F^1$ and $F^2$ and also of the barb, is illustrated in Figs. 6 and 7 wherein L represents a hand pivoted in a recess on the outer end of a gripper-bar $F^1$. To this hand is pivoted one end of a spring strip U which lies in a groove in the back side of bar $F^1$, passing through a window therein, and, at its lower end, is pivoted to a lever $D^{10}$, mounted on the said bar $F^1$. Lever $D^{10}$ has a pin, or roller, $D^{11}$, at its outer end which rides in a transverse groove in a plate $D^3$. The plate $D^3$ is mounted on an underlying diamond-shaped plate $D^2$ which sets in a recess in plate $D^1$ aforesaid to which the bar $F^1$ is jointed at its rear end, but has a short play therein in a longitudinal direction. The means for moving the said plate $D^2$ with respect to plate $D^1$ in which it is set will be described hereinafter, but when it is so moved, in an upward direction, it will obviously lift lever $D^{10}$ and push strip U upward, thereby turning the hand L out into line with the body of bar $F^1$, as indicated by dotted lines. Conversely, when plate $D^2$ is moved downward, with respect to plate $D^1$, it will turn the hand L outward at right angles to the gripper-bar $F^1$, as shown in full lines in Fig. 6. The barb Q is also pivoted in the gripper-bar $F^1$, an inch or two below the hand L and parallel thereto. It is also worked by strip U simultaneously with the hand L. A tongue $Q^1$ stamped out of the strip U is bent, at its outer extremity, around a cross-bar in the base of the barb to form an operating pivot connection therewith. The hand U and the barb Q are both turned simultaneously from one position to the other with respect to the gripper-bar $F^1$. The companion gripper-bar, $F^2$, is provided with a similar hand L, but not with a barb Q, which is only needed on the gizzard side of the bird. When the two hands are projected toward each other, they may meet and touch, thereby preventing the escape of any material between them, when the gripper is withdrawn from the bird.

The motor-driven cam mechanism, by which the several parts of the machine are operated in their proper time relation is best illustrated in Fig. 3, wherein H represents an electric motor which, through a cone clutch $E^{21}$ and a worm, drives the main gear wheel W. It is one purpose of this invention to keep the motor constantly running and to control the machine by the clutch. That is because of the cyclic character of the operations to be performed and the treatment of a single bird by each cycle. The movable element $E^{19}$ of the clutch is operated, to close the clutch, by a leftward push on rod $E^4$, through a bell-crank and vertical rod $H^1$. The starting handle is $H^{14}$ by which the vertical rod $H^1$ may be lifted and then locked by a weighted latch $H^4$. There is, on wheel W, a roller $E^{13}$ which rides the under edge of a cam P on the bottom of lever $E^{34}$, and the outer end of that lever is connected, by a link $J^8$ to the aforementioned sliding plate $J^1$ that operates the cutter blades D and E through links $J^2$ and $J^3$. The said cam P is so shaped that when wheel W starts, it moves lever $E^{34}$ up rapidly, thereby giving blades D and E a quick advance ahead of the gripper. The cam P is also so shaped that, after the aforesaid quick advance of the cutter blades, the lever $E^{34}$ will drop down suddenly and pull back the said blades. There is also on wheel W a pin $E^{11}$ to which is journalled one end of a crank rod $E^{10}$ (shown partly broken away at its center) and, on the opposite end of said rod $E^{10}$ is a pin $H^{12}$ which is linked by bar $H^{20}$ to the frame of the machine at $H^{21}$ and also enters long slots in the adjacent levers $H^6$ and $H^5$, the former of which is pivoted to the latter. The lever $H^6$, at its right-hand end, is connected, by link $D^{19}$, to the aforesaid plate $D^1$ that carries the two gripper-bars and the spreader toggles, while the lever $H^5$, at its right-hand end, is connected, by link $D^{18}$, to the above described diamond-shaped plate $D^2$, which is set into plate $D^1$ with a slight longitudinal play thereon and carries, in turn, the plate $D^3$ having the transverse groove engaged by the pins or rollers $D^{11}$ on the hand-and-barb-operating levers $D^{10}$. The slots above mentioned, in the respective levers $H^5$ and $H^6$, which slots are traversed by the pin $H^{12}$ on crank arm $E^{10}$, are coincident for the greater part of their length, so that levers $H^5$ and $H^6$ move together and push up the plates $D^1$ and $D^2$ at about the same rate. At their right-hand ends however the slot in lever $H^5$ is turned slightly downward. Thereby the advance of plate $D^2$ is halted while the advance of plate $D^1$ is continued. That separates $D^1$ and $D^2$ and the transverse groove in the latter therefore draws down on levers $D^{10}$ and they, in turn, pull on the strip U and throw out the hands L and the barb Q to their right-angled position with respect to the gripper-bars. As the wheel W makes the second half of its single rotation, it draws down the levers $H^5$ and $H^6$, which it had pushed up during the first half rotation, and thereby draws back the grippers on their reverse stroke. As the lever $H^5$ returns to its normal position, it strikes the screw-stop on the left-hand arm of bell-crank $E^{33}$ which, in turn, pushes rod 35 to the right and throws the latch knock-out 42 to the left. That dislodges the latch $H^4$ from its engagement with the notch in vertical rod $H^1$. Rod $H^1$ thereupon drops down and disengages clutch $E^{21}$.

On the shaft of the aforesaid wheel W is a bevel gear $H^{10}$ which meshes with a similar gear on the lower end of a diagonal shaft $H^8$ that extends up toward the upper left corner of the casing under the bird-platform $A^1$ where it has a bearing in bracket $H^7$ and carries a crank $H^9$. This crank through rods $A^{40}$ and $A^{36}$ operates the leg-knives $A^4$ and also, through a short jack-shaft $A^{34}$ and rod $A^{44}$, the neck-knife $T^3$. The jack-shaft $A^{34}$ contains two gimbal joints to permit the above-described adjustment of the table.

What is claimed as new and desired to secure by Letters Patent is:

1. A machine for dressing poultry, comprising a cutter movable into and out of the body of the fowl, a separately operating gripper also movable into and out of the body of the fowl, and a common operating means acting on said cutter and gripper in timed relation.

2. A machine for dressing poultry, comprising a cutter and a gripper each separately movable along a common route into and out of the body of the fowl, and a common operating means acting on said cutter and gripper in timed relation.

3. A machine for dressing poultry, comprising a cutter, a gripper following the cutter but movable separately with relation thereto, and reciprocating mechanism for the gripper causing it to outreach the cutter with relation to the body of the fowl.

4. A machine for dressing poultry, comprising a receiving table for the fowl and clamp for securing it thereon, a cutter and a gripper mounted externally to said table and movable in parallel planes, and reciprocating mechanism acting to project said cutter and gripper over said table into and out of the body of the fowl.

5. A machine for dressing poultry, comprising a cutter having two blades movable in parallel lines but at a variable distance apart, and a gripper separate from the cutter and also having two members that are also movable in parallel lines but at a variable apart.

6. A machine for dressing poultry, comprising a cutter and a gripper each having two members reciprocating in parallel lines at a variable distance apart, and separately-timed operating means for the said cutter and gripper.

7. A machine for drawing poultry, comprising a receiving table for the fowl, a cutter and a gripper reciprocating over said table into and out of the body of the fowl, the cutter being wider than the gripper at the point of entry into the fowl.

8. A machine for dressing poultry, comprising a reciprocating cutter having two spreadable blades, a separate reciprocating gripper having two spreadable members and means for controlling automatically the spacing of cutter blades and gripper members.

9. A machine for dressing poultry, comprising a receiving table for the fowl, a gripper reciprocating over said table into and out of the body of the fowl, an operating motor for said gripper, a manual starter for the gripper, and an automatic stop therefor dependent on its reciprocation cycle.

10. A machine for dressing poultry, comprising a receiving table for the fowl, a cutter and a gripper reciprocating over said table into and out of the body of the fowl, an operating motor, and two separate vibrator mechanisms one between the motor and said cutter to reciprocate the cutter and the other between the motor and the gripper to reciprocate the gripper.

11. A machine for dressing poultry, comprising a receiving table for the fowl, a cutter and a gripper both reciprocating over said table into and out of the body of the fowl, an operating motor, separate vibrating mechanism between the motor and the cutter and gripper respectively, and an automatically-opened clutch between said mechanism and the motor.

12. A machine for dressing poultry, comprising a reciprocating gripper, a reciprocating cutter outside of and enclosing the gripper, an operating motor and separate reciprocating mechanism between the motor and the gripper and cutter respectively.

13. A machine for dressing poultry, comprising a receiving table for the fowl, a two-blade cutter reciprocating towards and from said table, a two-part gripper also reciprocating towards and from said table and automatic spacing mechanism for the said cutter blades and the two gripping members acting to change the space relation thereof during their reciprocating movement.

14. A machine for dressing poultry, comprising a receiving table for the fowl, a cutter and a gripper both reciprocating towards and from said table, an operating motor therefor, and a speed mechanism between said motor and the cutter giving the cutter a lead over the gripper in their approach towards the fowl on said table.

15. A receiving table for a poultry-dressing machine provided with side clamps between which a fowl may be secured and wing clamps located above the side clamps.

16. A receiving table for a poultry-dressing machine having a body clamp for a fowl thereon and spaced leg clamps therefor at each of the hock joints.

17. A combined leg-clamp and cutter for a poultry-dressing machine having a knife acting between the abutting parts of the hock joint and a leg-gripping clamp at one side of said knife.

18. A receiving table for a poultry-dressing machine having a bridge serving at each end as an abutment for a leg clamp and two supplementary abutments outside the respective ends of the bridge.

19. In a poultry dressing machine, a blade of channel shape having a plurality of spear-like points at its leading end, and means for imparting reciprocable and lateral movements to said blade.

20. In a poultry dressing machine, a cutter comprising a box-like blade mounted to reciprocate bodily into and out of a fowl supported by the machine, and provided with diagonal cutting edges on its leading extremity, and means for imparting longitudinal and lateral movements to said blade.

21. In a poultry dressing machine, a cutter comprising two reciprocably supported spaced apart relatively movable blades, means acting to hold said blades in normally overlapped relation, and means for holding said blades in spaced apart relation during their reciprocating movement.

22. In a poultry dressing machine, a reciprocable carrier, a gripper member mounted thereon, a tip hinged to one extremity thereof so as to move to an angular position with respect to the body of the gripper, and means operated during movement of the carrier for controlling the angular position of said tip with respect to said body.

23. In a poultry dressing machine, a reciprocable carrier, a gripper member mounted on said carrier and having its outer extremity provided with a foldable barb, an operating member connected with said barb, and means operated during movement of said carrier for actuating said operating member.

24. In a poultry dressing machine, a gripper member having a foldable barb at one end, a second barb spaced therefrom and normally lying at an angle with respect to the gripper member, and means for simultaneously actuating both of said bars.

25. In a poultry dressing machine, a cutter having a blade of angular cross section provided with a diagonal cutting edge on its leading extremity, and guide means engaging the intersecting angular portions of said blade.

AGNESE C. JANSEN,
*Administratrix of the Estate of Ernest D. Jansen, Deceased.*